Figure 1:
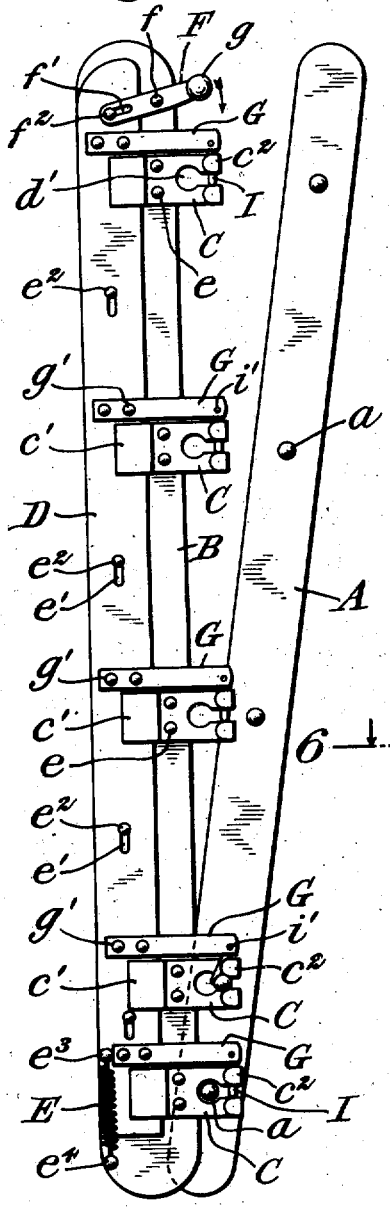

A. E. POLLOCK & L. ROSENBERG.

AUTOMATIC FASTENER.

APPLICATION FILED SEPT. 15, 1915.

Reissued Nov. 2, 1915.

14,005.

WITNESS:

M. C. Abbott

INVENTORS

Adolph E. Pollock and

Louis Rosenberg

BY

Edward Rosenberg

ATTORNEYS

UNITED STATES PATENT OFFICE.

ADOLPH E. POLLOCK AND LOUIS ROSENBERG, OF NEW YORK, N. Y., ASSIGNORS, BY DIRECT AND MESNE ASSIGNMENTS, TO HAROLD L. SIEGEL, TRUSTEE, OF SALT LAKE CITY, UTAH.

AUTOMATIC FASTENER.

14,005. Specification of Reissued Letters Patent. Reissued Nov. 2, 1915.

Original No. 1,075,438, dated October 14, 1913, Serial No. 711,787. Application for reissue filed September 15, 1915. Serial No. 50,911.

*To all whom it may concern:*

Be it known that we, ADOLPH E. POLLOCK and LOUIS ROSENBERG, both citizens of the United States, residing in the city of New York, borough of Manhattan, county and State of New York, have invented a certain new and useful Automatic Fastener, of which the following is a specification.

This invention is a fastener for two meeting parts such as the stay strips of women's corsets, leggings, and other articles of apparel, or the like.

Heretofore it has been proposed to provide a fastener wherein a series of studs on one member may be engaged with a series of keepers on another member, said keepers being pivoted separately to the second member and being pivoted, also, to a releasing slide which is impelled in one direction by a spring and is actuated by a hand-operated lever in a manner to simultaneously release the studs, thereby providing means for quickly disengaging all the studs. In connecting the two members of such prior fasteners it is necessary to thrust the headed studs separately into the keepers in the ordinary manner of connecting the common style of corset fastenings. Furthermore, in the operation of releasing the fastening, the pivoted keepers are not moved wholly out of the path of the studs.

According to the present invention, the keepers are normally closed by yieldable latches in such manner that the headed studs are adapted to easily and quickly enter the keepers without thrusting the studs separately into the keepers, although this may be done if so desired. Said yieldable latches are carried on separate arms which are attached to a single releasing member, the latter being retained slidably in position by the keepers. Said slide is actuated by a spring to normally retain the latches in position for closing the entrance to the keepers, but the slide may be shifted by a suitable operating member, thus withdrawing the latches simultaneously from the keepers and out of the path of the studs.

The salient feature of the present invention resides in a plurality of yieldable latches adapted to be pressed by movement of the studs when inserting the same into the keepers whereby the two members may be easily and quickly connected, said latches being releasable simultaneously in order to quickly separate the two members.

Other features of the invention, and the functions and advantages thereof, will appear in the course of the following detailed description.

In the accompanying drawings, we have illustrated one practical embodiment of the invention, but the construction shown therein is to be understood as illustrative, only, and not as defining the limits of the invention.

Figure 2:
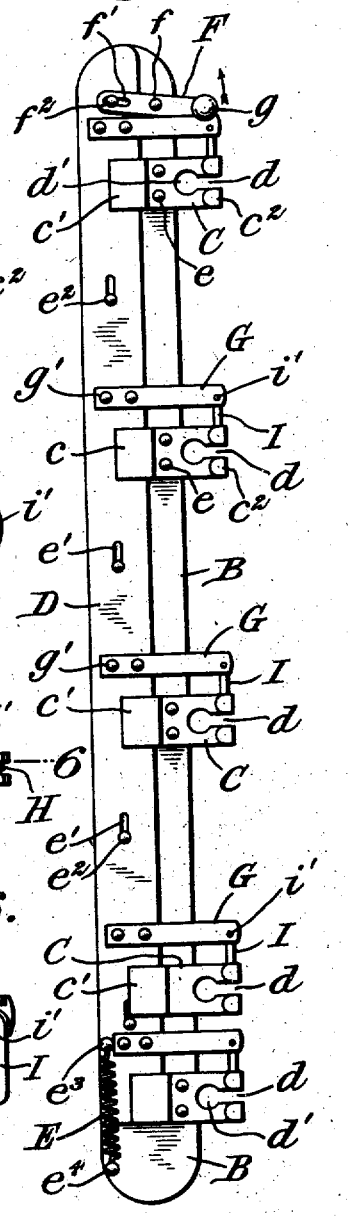
Figure 3:
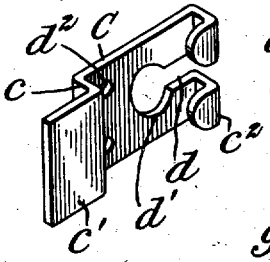
Figure 4:
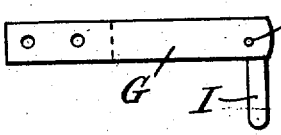
Figure 5:
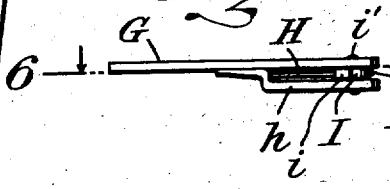
Figure 6:
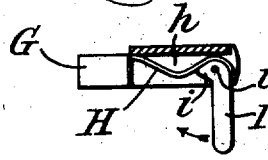

Figure 1 is a front elevation illustrating our invention embodied in a fastener especially adapted for use on corsets, one member of the fastener being shown in a position to introduce the studs successively into the keepers on the other member of the fastener. Fig. 2 is a view similar to Fig. 1, but with the member carrying the studs removed, and with the releasing slide and series of latches moved into positions to open the throats of the slots in the series of keepers, whereby the studs of one member may be simultaneously released. Fig. 3 is a detail perspective view of one of the keepers. Fig. 4 is a side view of an arm carrying one of the automatic latches. Fig. 5 is an inverted or bottom plan view of the arm and the latch shown in Fig. 4. Fig. 6 is a detail sectional elevation on the line 6—6 of Fig. 5.

A B designate two members to be connected together, said members being shown in the form of strips and adapted to be fastened or attached in any usual or preferred way to the edges of an article, such as a corset, legging or other article. Member A is provided with a series of studs *a*, each of which is headed, said member and the studs thereof being similar to the part used in an ordinary corset fastener. The other member B is provided with a series of keepers, C, the number and position of which correspond to the number and position of studs on member A. Each keeper is preferably constructed as shown in detail in Fig. 3, that is to say, the keeper consists of a body portion, one end of which is bent to produce a shoulder *c* and a guide *c'*, whereas the other end of the keeper is bent or doubled upon itself to produce a catch $c^2$. The keeper is provided, furthermore, with a longitudinal slot *d*, one end of which extends through the catch $c^2$ so as to produce an open throat said slot operating to divide the catch into two parts, as clearly shown in Figs. 2 and 3. If desired the other end of the slot may be enlarged to produce an eye $d'$. In addition to the slot and the eye, the keeper is provided with apertures $d^2$. The keeper may be made in any desired way, but preferably it is stamped from a single piece of metal and bent to the form shown in Fig. 3. Each keeper is applied laterally to member B in a position to partially extend across said member and for its slotted portion to project beyond an edge of the member, see Figs. 1 and 2. The keeper is attached to member B in a suitable way, as for example by rivets $e$, the latter passing through apertures $d^2$ and through member B, thus fastening each keeper rigidly to the member. Each member is so attached that guide $c'$ is spaced with reference to member B, and said keepers are fastened in corresponding positions to the member B so that the guides $c'$ are in alinement with each other lengthwise of the member whereby said guides operate to retain a slidable releasing member D is coöperative relation to the member B and keepers C thereon. It will be understood that keepers C are attached at proper intervals to member B and when the two members A B are to be connected the headed studs $a$ on member A are introduced through the open throats or ends of slots $d$ in keepers C.

Releasing member D is a strip or plate which is applied laterally against member B so as to slide within guides $c'$ of the series of keepers. Said releasing member is shown as having longitudinal slots $e'$ through which pass pins or studs $e^2$ for the purpose of slidably connecting the slotted releasing member to the keeper carrying member B. Releasing member D is not quite so long as member B and it is normally impelled in one direction by a spring such as E, one end of the spring being attached at $e^3$ to member D, whereas the other end of the spring is anchored at $e^4$ on the lower part of member B. The releasing member is operated by any suitable device carried on member B so as to be accessible to the person wearing the corset, one such form of operating device being shown as a finger lever F. Said lever is fulcrumed by pin $f$ to member B near the upper part thereof, and this lever is shown as having a slot $f'$ in which operates a headed stud $f^2$ attached to releasing member B, whereby the lever is operatively connected to the releasing member. The lever extends beyond one edge of member B, and at its free end said lever is provided with an operating piece $g$, shown in Figs. 1 and 2 as a knob.

The releasing member is provided with a series of arms G, the number of which corresponds to the keepers, said arms being attached rigidly to the releasing member in a suitable way, as for example by the rivets $g'$. The arms are positioned on the releasing member above and quite close to the keepers C on member B in the normal position of member D relative to member B, see Figs. 1 and 2. Each arm G may be of any suitable construction, but preferably the arm is composed of sheet metal substantially as shown in Figs. 4, 5 and 6. The arm is cut or stamped from a piece of sheet metal, and a part of the arm is folded or doubled upon itself so as to produce a casing $h$, in the chamber of which is positioned a spring H, and the pivoted end of an automatic latch I. Each rigid arm G is provided with one automatic latch and a spring for actuating said latch. The latch is in the form of a flat straight plate except for an enlargement or offset $i$ near one end, said enlargement or offset constituting a cam. The cam shaped end of the latch is positioned within chamber $h$ of the rigid arm, and said latch is loosely connected to the arm by a pin or rivet $i'$, the latter passing through the arm and the latch, whereby the latch is pivotally attached to the arm. The cam shaped end $i$ of the latch is engaged by the spring H, the latter being positioned within the chamber of the arm so as to be housed or concealed from view thereby. The spring may be attached to the arm in any suitable way for the purpose of retaining said spring in operative relation to the latch. As shown the spring is curved so as to engage with the pivoted cam shaped end of the latch, said spring operating to retain the latch in a depending position relative to the arm. The arms are attached to the releasing member and the latches are pivoted to said arms so that the lower ends of the latches are normally in engagement with the catches $c^2$ of keepers C, said latches being retained in engagement with the keepers when the releasing member is in the closed position, as shown in Fig. 1, or when said releasing member is adjusted to an open position as shown in Fig. 2, whereby the latches are held from movement forwardly of the keepers by the engagement of said latches with catches $c^2$.

In the normal position of the parts, spring E draws releasing member D in a downward direction relative to member B and the arms G of said releasing member are positioned quite close to the keepers. The latches I attached to arms G are lowered within the catches $c^2$ of the keepers so that the latches extend across the open throats of slots $d$ in the keepers, as shown clearly in Fig. 1, whereby the latches act to normally close the open ends of the slotted keepers. When it is desired to engage the studs on member A with the slotted keepers attached to member B, it is not necessary to manipulate lever F or disturb the position of releasing member D. On the contrary, member A is drawn toward member D so that the studs *a* will enter the open ends of the slots *d* in the keepers, and as the parts are drawn together, the pressure of the studs against the latches will press said latches out of the path of the studs so that said studs will enter the slots in the keepers. During this movement the pressure of each stud against one latch will swing the latch on its pivot and in a backward direction, thus overcoming the tension of the spring, but as the stud moves past the latch the spring acts upon said latch to return it automatically to a position where it again closes the throat of the slot in the keeper, the spring being returned into engagement with catch $e^2$ of said keeper. A convenient way of connecting the two members is to incline one member relatively to the other member, as shown in Fig. 1, and to gradually draw the studs of member A into engagement with the latches and keepers successively, but if desired, the studs of member A may be slipped in the ordinary way through the enlarged eyes *d'* of the slots in the keepers, although this is not the usual or preferred way of connecting the two members. When the studs are positioned within the slots of the keepers the latches preclude movement of the studs in a direction to separate member A from member B, and thus the latches act to retain the studded member in engagement with the keeper member although the operation of connecting one member to the other may be performed very easily and quickly. To disengage one member from the other it is only necessary for the operator to press on lever F in a direction to overcome the tension of spring E thereby lifting releasing member D and arms G, whereupon latches I are withdrawn from their closed positions across the open ends of slots *d* in the keeper. The studs are thus released simultaneously so that the pressure of the wearer upon the corset will force the studs of member A out of the slots of the keepers or members B, thereby instantaneously releasing the fastening. It is evident that when the latches are withdrawn simultaneously from their operative relation to the keepers, the studs of member A will be free to pass out of the slots in the keepers.

An advantage of our construction is that the parts may be easily and quickly connected, said parts are securely retained in their operative connected relation, and the studs are released simultaneously by the operation of a single member. This operating member can easily be released from outside the clothing of the wearer, thus affording a means for removing the pressure upon the person should the corset become uncomfortable for any cause.

Having thus fully described the invention, what we claim as new, and desire to secure by Letters Patent is:

1. In a fastener of the class described, the combination with two members, and studs on one member, of keepers on the other member, said keepers being provided with slots which extend through the outer ends of the keepers whereby the studs are movable in a sidewise direction through said open ends of the slots in the keepers, a slidable releasing bar, and a series of yieldable latches movable with the releasing bar, said latches being separately spring actuated and being free to yield individually to the entrance of said studs into the keepers without imparting movement to the releasing bar.

2. In a fastener of the class described, the combination with two members, and studs on one member, of keepers on the other member, said keepers extending outwardly from said member and said keepers being each provided with a slot which extends or opens through the outer end thereof, separate latches yieldable individually to the pressure of the separate studs when moved in a sidewise direction into the keepers and through the open ends of the slots therein and said studs being adapted to be successively engaged with said keepers and latches, and releasing means for disengaging the latches simultaneously from the studs, said yieldable latches acting to admit the studs into the keepers without imparting movement to the releasing means.

3. In a fastener of the class described, the combination with two members, and studs on one member, of keepers on the other member, said keepers being provided with a slot, which extends through that part of the keeper distant from the member to which said keeper is attached, a releasing bar, and separate spring actuated latches pivotally supported on the releasing bar, said latches being yieldable individually to the entrance of the studs into the keepers and without imparting movement to the releasing bar, and said studs being each movable in a sidewise direction by passing it through the open end of the slot in one of the keepers.

4. In a fastener of the class described, the combination with two members, and studs on one member, of keepers on the other member, said keepers being each provided with a slot which extends through the outer end of said keeper, a releasing bar, and separate latches supported on the releasing bar independently of either of said members, said latches being yieldable individually to the entrance of the studs into the keepers and without imparting movement to the releasing bar and said studs being movable in a sidewise direction through the open ends of the slots in the keepers, whereby the studs may be engaged successively with the keepers.

5. In a fastener of the class described, the combination with two members and a series of studs on one member, of a series of keepers on the other member, said keepers having guides at one end thereof and open ended slots, a slidable member fitting in the guides of said keepers, a series of arms on the slidable member, separate latches pivoted to the arms and positioned to close the open ends of the slots in the keepers, and means for operating the slidable member.

6. In a fastener of the class described, the combination with two members and a series of studs on one member, of a series of keepers on the other member, a releasing member slidably connected to the member having said keepers, a series of arms rigid with said slidable member, a series of latches pivoted to the arms, each latch being spring actuated and normally positioned to close the entrance to one keeper, said latches being yieldable by contact with the studs for the latter to freely enter the keepers, and means for operating the releasing member.

In testimony whereof we have hereto signed our names to this specification in the presence of two subscribing witnesses.

ADOLPH E. POLLOCK.
LOUIS ROSENBERG.

Witnesses:
JULIUS FEDER,
RICHARD ARTHUR.